United States Patent
Vogman

(10) Patent No.: US 10,027,129 B2
(45) Date of Patent: Jul. 17, 2018

(54) REDUNDANT SERVER SYSTEM WITH AN OPTIMIZED FAILOVER ARRANGEMENT

(75) Inventor: Viktor D. Vogman, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 881 days.

(21) Appl. No.: 13/995,584

(22) PCT Filed: Dec. 28, 2011

(86) PCT No.: PCT/US2011/067683
§ 371 (c)(1),
(2), (4) Date: Sep. 18, 2013

(87) PCT Pub. No.: WO2013/101009
PCT Pub. Date: Jul. 4, 2013

(65) Prior Publication Data
US 2014/0001871 A1    Jan. 2, 2014

(51) Int. Cl.
*H02J 5/00* (2016.01)
*H02M 1/42* (2007.01)
(Continued)

(52) U.S. Cl.
CPC ............... *H02J 5/00* (2013.01); *H02M 1/32* (2013.01); *H02M 1/4208* (2013.01); *H02M 7/23* (2013.01);
(Continued)

(58) Field of Classification Search
CPC .......... H02J 5/00; H02M 1/32; H02M 1/4208; H02M 7/23; H02M 2001/007;
(Continued)

(56) References Cited

U.S. PATENT DOCUMENTS 5,461,303 A * 10/1995 Leman ............... H02M 1/4225
 323/209
6,230,403 B1 * 5/2001 Skoolicas ............... H02M 3/00
 174/117 FF (Continued)

FOREIGN PATENT DOCUMENTS

EP  0436324 A2  7/1991
JP  07-194118 A  7/1995
(Continued)

OTHER PUBLICATIONS

International Preliminary Report on Patentability and Written Opinion received for PCT Patent Application No. PCT/US2011/067683, dated Jul. 10, 2014, 6 Pages.

(Continued)

*Primary Examiner* — Rexford Barnie
*Assistant Examiner* — Thai Tran
(74) *Attorney, Agent, or Firm* — Jordan IP Law, LLC

(57) ABSTRACT

Methods and platforms may include a common bus, and a set of redundant power supply modules coupled to the common bus. Each power supply module can have a conversion circuit, an AC fault detector coupled to the conversion circuit, and a DC fault detector coupled to the conversion circuit. The platform may also include a system coupled to the common bus.

23 Claims, 4 Drawing Sheets

(51) Int. Cl.
*H02M 1/32* (2007.01)
*H02M 7/23* (2006.01)
*G06F 1/30* (2006.01)
*G06F 1/26* (2006.01)
*H02M 1/00* (2006.01)

(52) U.S. Cl.
CPC ............... *G06F 1/263* (2013.01); *G06F 1/30* (2013.01); *H02M 2001/007* (2013.01); *H02M 2001/325* (2013.01); *Y02B 70/126* (2013.01); *Y10T 307/707* (2015.04)

(58) Field of Classification Search
CPC ......... H02M 2001/325; Y10T 307/707; Y02B 70/126; Y02B 70/12; G06F 1/30; G06F 1/263
USPC .......................................................... 307/82
See application file for complete search history.

(56) References Cited

U.S. PATENT DOCUMENTS

| | | | |
|---|---|---|---|
| 7,705,488 B2 | 4/2010 | Clemo et al. | |
| 8,340,933 B1* | 12/2012 | King, Jr. | G06F 11/24 702/63 |
| 2002/0101752 A1* | 8/2002 | Harris | G06F 1/26 363/144 |
| 2003/0184937 A1 | 10/2003 | Kanouda et al. | |
| 2004/0181698 A1* | 9/2004 | Williams | G06F 1/28 713/300 |
| 2005/0055111 A1* | 3/2005 | Law | G05B 19/0426 700/83 |
| 2006/0080494 A1* | 4/2006 | Kawaguchi | G06F 11/2015 711/4 |
| 2006/0098463 A1* | 5/2006 | Baurle | H02M 3/33507 363/21.01 |
| 2006/0220463 A1 | 10/2006 | Patel et al. | |
| 2006/0279267 A1* | 12/2006 | Burton | H02M 7/003 323/282 |
| 2009/0134703 A1 | 5/2009 | Chung et al. | |
| 2010/0080022 A1* | 4/2010 | Schmidt | H02M 7/062 363/53 |

FOREIGN PATENT DOCUMENTS

| | | |
|---|---|---|
| JP | 2005-261116 A | 9/2005 |
| WO | 2013/101009 A1 | 7/2013 |

OTHER PUBLICATIONS

International Search Report and Written Opinion received for PCT application No. PCT/US2011/067683, dated Sep. 26, 2012, 9 pages.

* cited by examiner

FIG. 4A
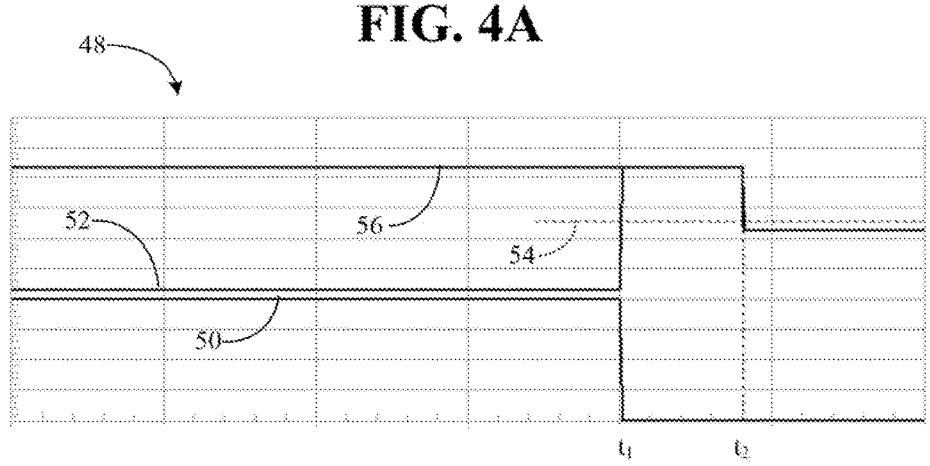
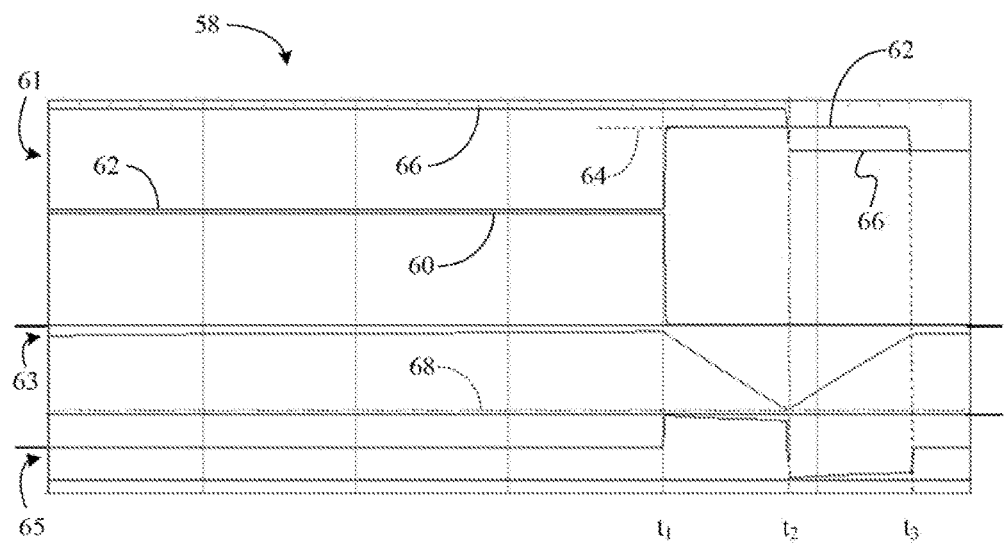
FIG. 4B

REDUNDANT SERVER SYSTEM WITH AN OPTIMIZED FAILOVER ARRANGEMENT

BACKGROUND

Technical Field

Embodiments generally relate to redundant power supplies. More particularly, embodiments relate to the use of direct current (DC) fault detectors to reduce the power rating requirements of redundant power supplies.

Discussion

Conventional server systems having redundant power arrangements may incorporate two or more power supply modules that are configured to continuously supply maximum power to the system when either an alternating current (AC) power source or one of the modules fails. For example, if the peak workload power consumed from a conventional redundant power subsystem containing two power modules is $P_{max}$, each of the modules is may typically be rated at $P_{max}$ or greater to maintain system operation when a failure occurs.

BRIEF DESCRIPTION OF THE DRAWINGS

The various advantages of the embodiments of the present invention will become apparent to one skilled in the art by reading the following specification and appended claims, and by referencing the following drawings, in which:

FIG. 4A is a signaling diagram of an example of a DC fault condition in a platform having redundant power supply modules with temporary peak power ratings that support a current spike associated with the DC fault condition according to an embodiment;

FIG. 4B is a signaling diagram of an example of a DC fault condition in a platform having redundant power supply modules that rely on a buffer capacitor to absorb a current spike associated with the DC fault condition according to an embodiment.

DETAILED DESCRIPTION

Embodiments may include a power supply module having a conversion circuit, an alternating current (AC) fault detector coupled to the conversion circuit, and a direct current (DC) fault detector coupled to the conversion circuit. In one example, the DC fault detector is coupled to a DC output of the conversion circuit, and the DC fault detector is configured to generate an alert signal in response to a fault condition in which an output voltage associated with the DC output drops below a threshold associated with a common bus.

Embodiments may also include a platform having a common bus, and a set of redundant power supply modules coupled to the common bus, wherein each power supply module includes a conversion circuit, an AC fault detector coupled to the conversion circuit, and a DC fault detector coupled to the conversion circuit. The platform can also include a system coupled to the common bus. In one example, the system includes a motherboard having a host device configured to throttle one or more components of the system in response to the alert signal.

Additionally, embodiments may include a method of fabricating a power supply module in which a conversion circuit is provided. The method can also involve coupling an AC fault detector to the conversion circuit, and coupling a DC fault detector to the conversion circuit.

Other embodiments can include a platform having a common bus, and a set of redundant power supply modules coupled to the common bus. Each power supply module may include a conversion circuit having an AC input, a bridge rectifier, a power factor correction (PFC) stage coupled to the bridge rectifier, a DC to DC converter coupled to the PFC stage, and a DC output coupled to the DC to DC converter. Each power supply module can also include an AC fault detector coupled to the conversion circuit, wherein the AC fault detector is configured to generate a first alert signal in response to a first fault condition associated with the AC input of the conversion circuit. Additionally, each power supply module may include a DC fault detector coupled to the DC output of the conversion circuit, wherein the DC fault detector is configured to generate a second alert signal in response to a second fault condition in which an output voltage associated with the DC output drops below a threshold associated with the common bus. The platform can also include a motherboard coupled to the common bus, wherein the motherboard has a host device configured to throttle one or more components on the motherboard in response to the first alert signal and the second alert signal.

Figure 1:
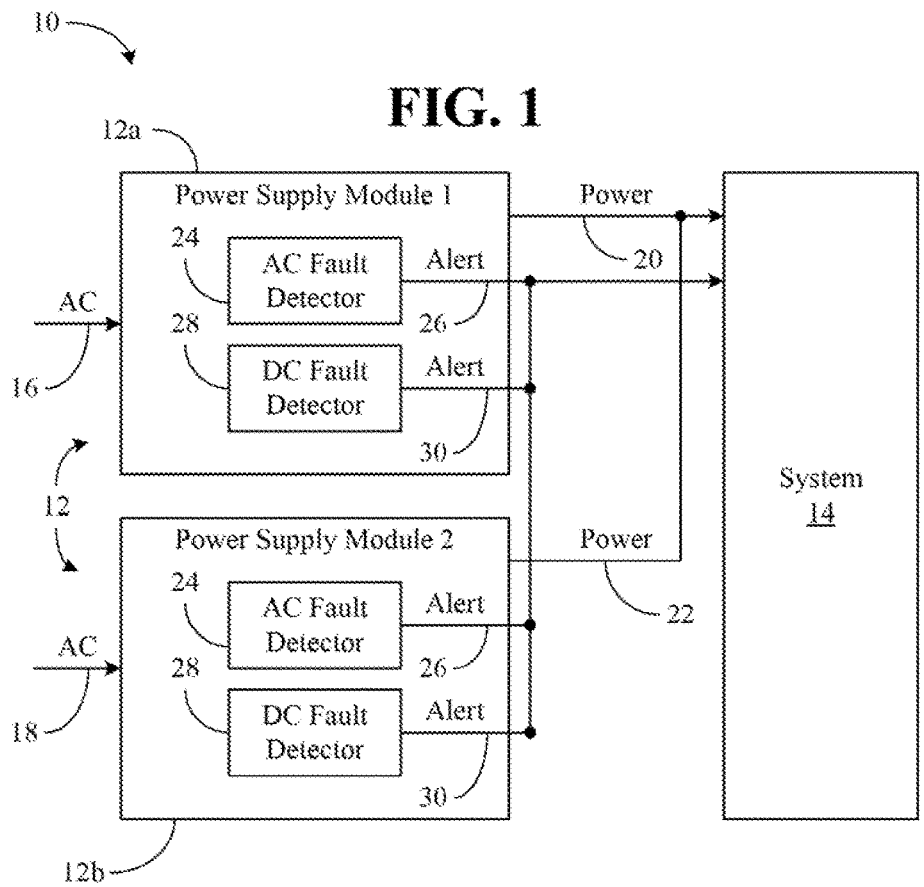
FIG. 1 is a block diagram of an example of a platform according to an embodiment.

Turning now to FIG. 1, a platform 10 is shown in which a set of redundant power supply modules 12 (12a, 12b) provide power to a system 14. In the illustrated example, a first power supply module 12a ("Module 1") generates DC power 20 based on a first AC signal 16, and a second power supply module 12b ("Module 2") generates DC power 22 based on a second AC signal 18. During normal operation, the illustrated power supply modules 12 share the power delivery responsibility for the system 14. If, however, one of the power supply modules 12 encounters a fault condition due to an internal failure or a failure of one of the AC signals 16, 18, the remaining power supply module may provide power to the system 14 by itself.

As will be discussed in greater detail, each power supply module 12 may include an AC fault detector 24 configured to generate an alert signal 26 in response to one or more fault conditions associated with its corresponding AC signal 16, 18, wherein the system 14 may throttle one or more components of the system 14 in response to the alert signal 26. Moreover, the illustrated power supply modules 12 include a DC fault detector 28 that generates an alert signal 30 in response to internal fault conditions such as rectifier failures, converter failures, capacitor shorts, and so forth. Thus, the system 14 may also be able to throttle its components in response to internal failures of the power supply modules 12. By using both the AC fault detector 24 and the DC fault detector 28, the power supply modules 12 may be able to be configured with a lower power rating than might be required if each power supply module 12 were configured to continuously supply maximum power to the system 14 as in conventional solutions. In particular, because the illustrated system 14 is able to throttle itself in response to any type of power supply failure, the power ratings of the power supply modules 12 can be reduced in proportion to the amount of throttling available.

Figure 2:
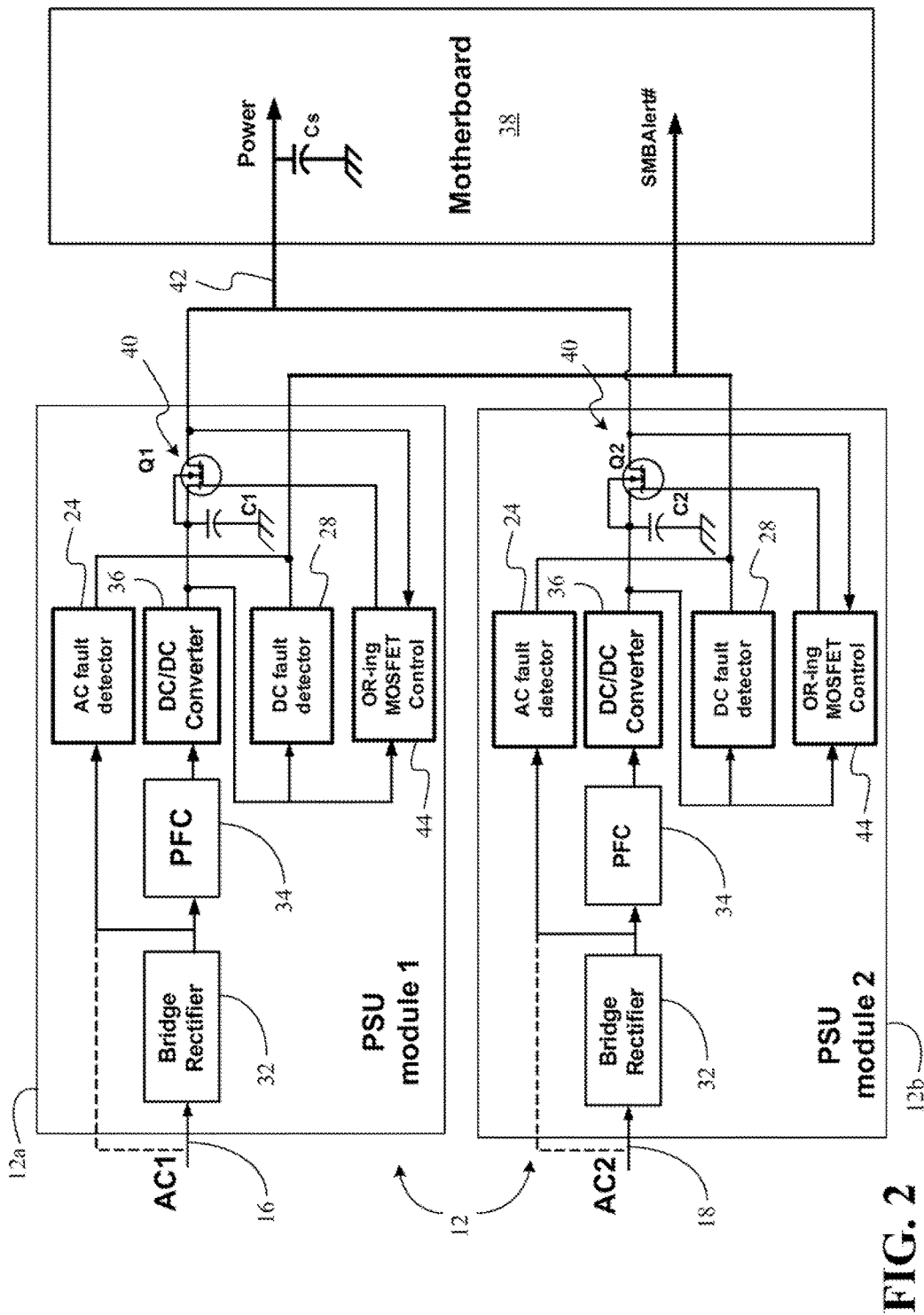
FIG. 2 is a detailed block diagram of an example of a platform according to an embodiment.

FIG. 2 shows a more detailed example of one approach to implementing the set of redundant power supply modules 12. In the illustrated example, each power supply module 12 includes a conversion circuit having a bridge rectifier 32, a power factor correction (PFC) stage 34, and a DC to DC (DC/DC) converter 36. The bridge rectifier 32 may rectify the sinusoidal voltage of the AC signal 16, 18, wherein the PFC stage 34 can be configured to convert the rectified sinusoidal voltage into a relatively high DC voltage (e.g., 400V). The DC/DC converter 36 may convert the high DC voltage into a relatively blow secondary voltage (e.g., 12V) that may be used by components of the system 14 (FIG. 1) such as a motherboard 38, hard drives, fans, voltage regulators (not shown), etc. The motherboard 38 may be part of, for example, a server, personal computer (PC), notebook computer, mobile Internet device (MID), smart tablet, and so forth.

As already noted, the power supply modules 12 may also include AC fault detectors 24 and DC fault detectors 28 that assert an alert signal such as, for example, an SMBAlert# (e.g., System Management Bus Specification, SBS Implementers Forum, Ver. 2.0, Aug. 3, 2000) signal or similar signal when the input or output voltages of the power supply modules 12 go out of predetermined ranges. The motherboard 38 may include a host device that throttles one or more components associated with the motherboard 38 in response to the alert signals. Each illustrated power supply module 12 also includes an isolation switch 40 that functions as an OR-ing device (e.g., MOSFET/metal oxide semiconductor field effect transistor) and isolates the output of the power supply module 12 from a common bus 42 in the case of failure. A control circuit 44 may be coupled to the isolation switch 40 in order to deactivate the isolation switch 40 in response to fault condition in which the DC output voltage drops below a threshold associated with the common bus 42.

When both AC source voltages are within the specified range and both modules 12 are operational, they may provide power to all system components. If, on the other hand, either of the AC signals 16, 18 fails, the corresponding AC fault detector 24 can quickly (e.g., within 1.0-1.5 ms after the fault) assert the SMBAlert# signal, which may in turn cause throttling of processor and memory power on the motherboard 38 and a reduction in system power consumption. Similar processes can take place in the event of a fuse or PFC stage 34 active component failure. If the DC/DC converter 36 fails (e.g., output capacitor short), the OR-ing MOSFET control circuit 44 can deactivate the isolation switch 40 and instantly isolate the failed module 12 from the common bus 42. Meanwhile, the illustrated DC fault detector 28 quickly (e.g., within a few microseconds after the fault) asserts the alert signal, which results in system power consumption reduction similar to the AC fault case.

Figure 3:
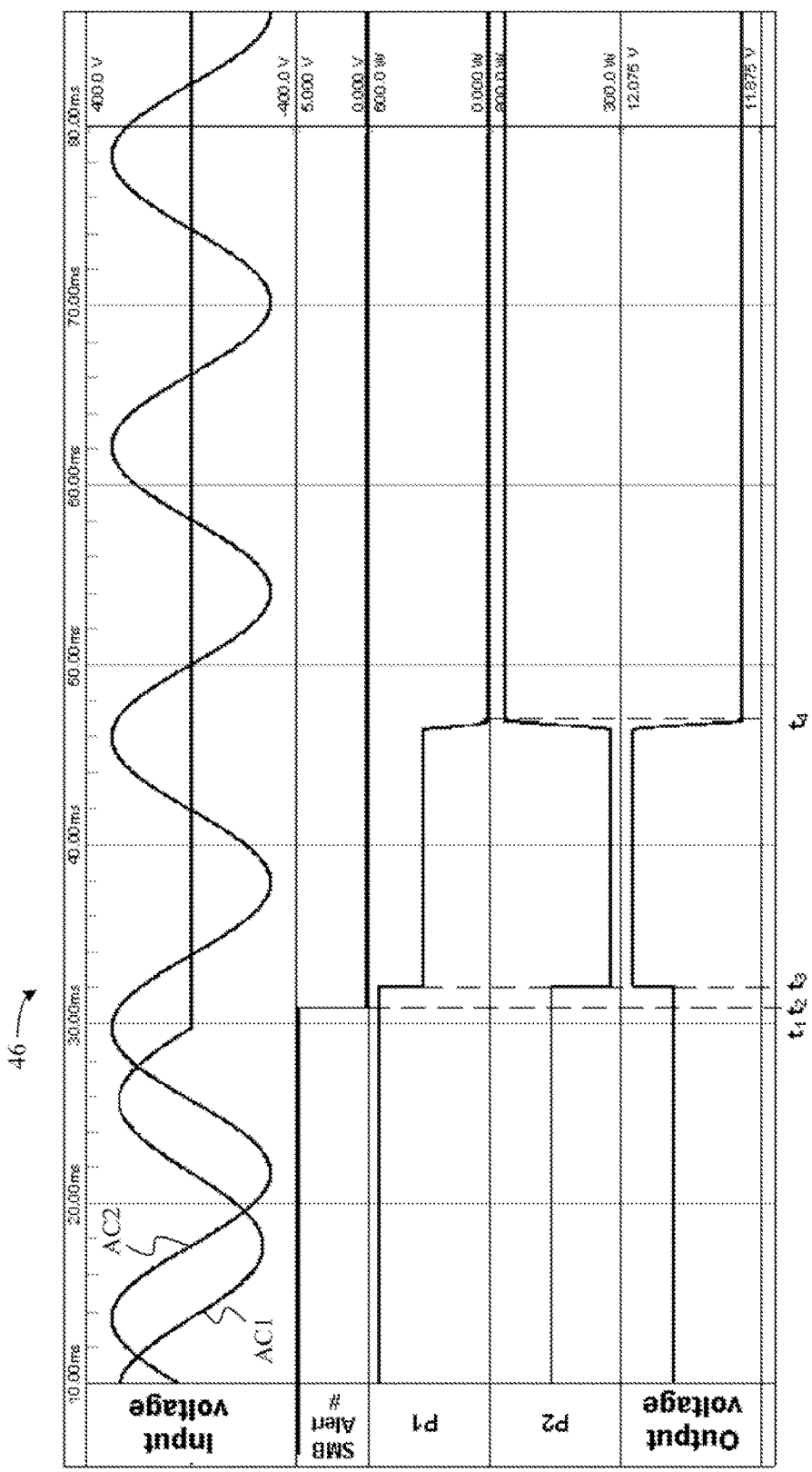
FIG. 3 is a signaling diagram of an example of an AC fault condition scenario according to an embodiment.

FIG. 3 shows an example of an AC failure mode process in a signaling diagram 46. In the illustrated example, prior to time $t_1$ both AC signals are functioning normally and the power supply modules 12 (FIGS. 1 and 2) share the load of supplying power to the system. In particular, the first power supply module has a power output ("P1") of about 600 W and the second power supply module has a power output ("P2") of about 600 W during normal operation in the example shown.

If one of the input AC voltages (e.g., AC1) drops to zero (time $t_1$), the AC fault detector may assert the alert signal (time $t_2$, within 1.0-1.5 ms after the fault), which can cause the system power to be throttled (time $t_3$). Since the first power supply module may be still energized by a bulk capacitor of the PFC stage 34 (FIG. 2), both modules may continue to share power during a "holdup time interval" between $t_2$ and $t_4$ (typically 10-20 ms). After the holdup time period ends at $t_4$, only the second module supplies power to the system. Since the consumed power has already been reduced, the power consumed from the second power supply module does not exceed its thermal design power (TDP) rating, the output voltage stays within regulation limits (bottom curve), and the module rating can be reduced (from system peak power consumption) by the amount of throttling provided in the system.

With regard to the DC failure mode, when both power supply modules are operational they can share the load of supplying power to the system similarly to the AC fault case. If one of the modules fails (e.g., Module 1), the power provided by the failed module may quickly drop to zero and the common bus voltage may continue dropping until the throttling process is complete and system power is reduced. There are a number of ways to maintain the common bus voltage within regulation limits during the time period between failure and system throttling.

One approach may be to design each power supply module to have a temporary peak power rating that supports a current spike that may accompany a DC failure in the other, failed module. The interval in question may typically be 1-2 ms, and such a temporary peak power rating could be achieved by adding some design margin for peak power over the power module TDP. Of particular note is that adding a peak power requirement for a short duration of time may not practically affect module size or cost.

FIG. 4A shows a signaling diagram 48 in which each power supply module has a temporary peak power rating that supports the current spike associated with a DC fault condition. In particular, during normal operation, a current plot 50 for the first power supply module and a current plot 52 for the second power supply module are below a module TDP level 54, although a system current plot 56 is above the module TDP level 54. At time $t_1$, the first power supply module fails and the illustrated current plot 50 corresponding to the first power supply module drops to zero. Accordingly, the current plot 52 may experience a temporary spike to the full system current level between times $t_1$-$t_2$. At time $t_2$, system throttling may be in place in order to bring the current plot 52 of the second power supply module below the TDP level 54. Thus, in the illustrated example, the power supply modules support full system power for the relatively short time period $t_1$-$t_2$.

Another approach to supporting DC fault conditions may be to enlarge module internal output capacitors such as, for example, C1 and C2 (FIG. 2) so that they are able to absorb the current spike associated with the DC fault condition and provide supplemental power to the system. Moreover, the power supply modules could simply rely on a common bus decoupling capacitor such as, for example, Cs (FIG. 2) to absorb the current spike associated with the DC fault condition. The justification for the latter approach may be that the bus decoupling capacitor can readily be made large enough to supply power to the system over a few milliseconds time interval. For example, to supply an extra 200 W of power over 1 ms, while maintaining a 5% voltage tolerance may require 3×10,000 µF capacitors, whose total volume wouldn't exceed 1.5 in$^3$ when standard aluminum electrolytic capacitors are used. When employing "supercaps" or assigning the buffer function to other existing baseboard and system capacitors connected to the common bus, the size of the required additional capacitance could become even smaller.

FIG. 4B shows a signaling diagram 58 in which a capacitor is used to absorb the current spike associated with a DC fault condition. Generally, the signaling diagram 58 includes system and power supply current plots 61, a supply voltage plot 63, and a capacitor current plot 65. In particular, during normal operation, a current plot 60 for the first power supply module and a current plot 62 for the second power supply module are below a module over power protection (OPP) limit 64, although a system current plot 66 is above the module OPP limit 64. At time $t_1$, the first power supply module fails and the illustrated current plot 60 corresponding to the first power supply drops to zero. Accordingly, the current plot 62 may experience a temporary spike between times $t_1$-$t_2$. The spike in the current plot 62 does not exceed, however, the module OPP limit 64, which is below the total power level drawn by the system.

To bridge the gap between the OPP limit 64 and the system power level, the capacitor (e.g., buffer capacitor) associated with the capacitor current plot 65 is sized to absorb the current spike associated with the DC fault condition and provide the additional power demanded by the system until throttling is in place at time $t_2$. Moreover, the second power supply module does not shut off during the time period $t_1$-$t_2$, because its output voltage supply voltage plot 63 remains within regulation limits. A minimum voltage level 68 that the common bus voltage reaches remains well above its undervoltage protection threshold. Once system throttling is fully active, the illustrated system current plot 66 drops (at time $t_2$), but the buffer capacitor is then being charged by the second power supply module, while its current plot 62 remains at the same level. Once the capacitor voltage reaches a nominal setpoint level at time $t_3$, the second power supply module current drops to the level consumed by the system, which is below the module's TDP. After time t3, similarly to the AC fault case, only the second power supply module supplies power to the system. Since the consumed power has been already reduced, a lower power rated module can fully support system operation. Thus, in both AC and DC fault cases, the module power rating can be reduced by the amount of throttling provided in the system.

For example, if system peak power consumption is 1200 W, and system (e.g., processor and memory) throttling can provide 400 W of power reduction (under a fault condition), 2×850 W power modules may support system operation under all failure conditions including AC source and power supply module faults. Accordingly, the techniques described herein can enable the use of smaller, less expensive redundant power supply arrangements in various computing systems such as servers, PCs, notebook computers, MIDs, smart tablets, and so forth.

Figure 5:
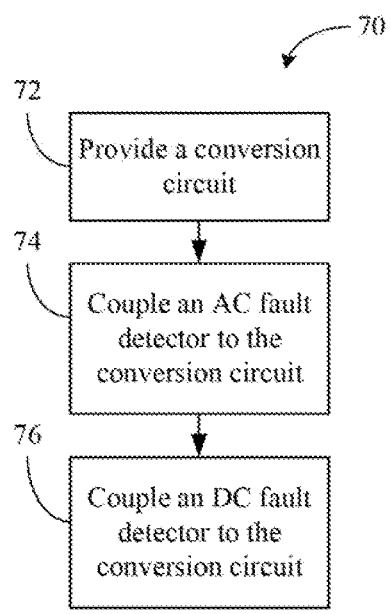
FIG. 5 is a flowchart of an example of a method of fabricating a redundant power supply according to an embodiment.

FIG. 5 shows a method 70 of fabricating a redundant power supply. The method 70 may be implemented using circuit technology such as, for example, application specific integrated circuit (ASIC), CMOS or transistor-transistor logic (TTL) technology, or any combination thereof. Illustrated processing block 72 provides a conversion circuit that may include, for example, a bridge rectifier, a PFC stage, a DC/DC converter, and so forth. An AC fault detector may be coupled to the conversion circuit at block 74. The AC fault detector could be implemented using, for example, a system-on-chip such as the 71M6521 energy meter integrated circuit from Teridian Semiconductor, Corp., or other suitable technology. Illustrated processing block 76 couples a DC fault detector to the conversion circuit. In one example, the DC fault detector may be coupled to a DC output of the conversion circuit, wherein the DC fault detector is configured to generate an alert signal in response to a fault condition in which an output voltage associated with the DC output voltage drops below a threshold associated with a common bus. The DC fault detector may be implemented, for example, in a comparator that trips at a voltage level equal to a sum of the minimum bus voltage and a voltage across a switch such as the isolation switch 40 (FIG. 2), already discussed.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. A platform comprising:
   a common bus;
   a set of redundant power supply modules coupled to the common bus, wherein each power supply module is associated with a power rating requirement and a thermal design power rating, and includes,
      a conversion circuit having an alternating current (AC) input, a bridge rectifier, a power factor correction (PFC) stage coupled to the bridge rectifier, a direct current (DC) to DC converter coupled to the PFC stage, and a DC output coupled to the DC to DC converter,
      an AC fault detector coupled to the conversion circuit, wherein the AC fault detector is configured to generate a first alert signal after detecting and in response to a first fault condition associated with the AC input of the conversion circuit, and
      a DC fault detector coupled to the DC output of the conversion circuit, wherein the DC fault detector is configured to generate a second alert signal in response to a second fault condition in which an output voltage associated with the DC output drops below a threshold associated with the common bus, and reduce the power rating requirement of each of the power supply modules from a peak power consumption to a power consumption equal to the peak power consumption less an amount of throttling available, wherein the peak power consumption does not exceed the thermal design power rating; and
   a motherboard coupled to the common bus, wherein the motherboard includes a host device configured to throttle one or more of processor power or memory power on the motherboard in response to the first alert signal and the second alert signal.

2. The platform of claim 1, wherein each power supply module further includes an output capacitor coupled to the DC output of the conversion circuit, wherein the output capacitor is sized to absorb a current spike associated with the second fault condition, wherein each power supply module is configured to not continuously supply maximum power, and wherein the second fault condition includes one or more of a rectifier failure, converter failure, or capacitor short.

3. The platform of claim 1, wherein each power supply module has a temporary peak power rating that is to support a current spike associated with the second fault condition.

4. The platform of claim 1, wherein the motherboard further includes a buffer capacitor coupled to the common bus, and wherein each power supply module is to rely on the buffer capacitor to absorb a current spike associated with the second fault condition.

5. A power supply module comprising:
   a conversion circuit;
   an alternating current (AC) fault detector coupled to the conversion circuit, wherein the AC fault detector is configured to generate a first alert signal after detecting and in response to a fault condition associated with an AC input, wherein the power supply module is associated with a power rating requirement and a thermal design power rating; and
   a direct current (DC) fault detector coupled to the conversion circuit, wherein the DC fault detector is configured to generate a second alert signal in response to a fault condition in which an output voltage associated with a DC output drops below a threshold associated with a common bus, and reduce the power rating requirement of each of the power supply modules from a peak power consumption to a power consumption equal to the peak power consumption less an amount of throttling available, wherein the throttling includes one or more of processor power or memory power, wherein the peak power consumption does not exceed the thermal design power rating.

6. The power supply module of claim 5, wherein the DC fault detector is coupled to the DC output of the conversion circuit.

7. The power supply module of claim 6, further including an output capacitor coupled to the DC output of the conversion circuit, wherein the output capacitor is sized to absorb a current spike associated with the fault condition.

8. The power supply module of claim 6, wherein the power supply module has a temporary peak power rating that is to support a current spike associated with the fault condition, wherein each power supply module is configured to not continuously supply maximum power, and wherein the second fault condition includes one or more of a rectifier failure, converter failure, or capacitor short.

9. The power supply module of claim 6, wherein the power supply module is configured to rely on an external buffer capacitor to absorb a current spike associated with the fault condition.

10. The power supply module of claim 5, wherein the conversion circuit includes:

a bridge rectifier;
a power factor correction (PFC) stage coupled to the bridge rectifier; and
a DC to DC converter coupled to the PFC stage.

11. A platform comprising:
a common bus;
a set of redundant power supply modules coupled to the common bus, wherein each power supply module is associated with a power rating requirement and a thermal design power rating, and includes,
a conversion circuit,
an alternating current (AC) fault detector coupled to the conversion circuit, wherein the AC fault detector is configured to generate a first alert signal after detecting and in response to a fault condition associated with an AC input to the power supply module, and
a direct current (DC) fault detector coupled to the conversion circuit, wherein the DC fault detector is configured to generate a second alert signal in response to a fault condition in which an output voltage associated with a DC output drops below a threshold associated with the common bus, and reduce the power rating requirement of each of the power supply modules from a peak power consumption to a power consumption equal to the peak power consumption less an amount of throttling available, wherein the throttling includes one or more of processor power or memory power, wherein the peak power consumption does not exceed the thermal design power rating; and
a system coupled to the common bus.

12. The platform of claim 11, wherein the DC fault detector is coupled to the DC output of the conversion circuit, and wherein the system includes motherboard having a host device configured to throttle one or more components of the system in response to the alert signal.

13. The platform of claim 12, wherein each power supply module further includes an output capacitor coupled to the DC output of the conversion circuit, and wherein the output capacitor is sized to absorb a current spike associated with the fault condition, wherein each power supply module is configured to not continuously supply maximum power, and wherein the second fault condition includes one or more of a rectifier failure, converter failure, or capacitor short.

14. The platform of claim 12, wherein each power supply module has a temporary peak power rating that is to support a current spike associated with the fault condition.

15. The platform of claim 12, wherein the system further includes a buffer capacitor coupled to the common bus, and wherein each power supply module is to rely on the buffer capacitor to absorb a current spike associated with the fault condition.

16. The platform of claim 12, wherein each power supply module further includes:
an isolation switch coupled to the DC output of the conversion circuit and the common bus; and
a control circuit coupled to the isolation switch, wherein the control circuit is configured to deactivate the isolation switch in response to the fault condition.

17. The platform of claim 11, wherein the conversion circuit includes:
a bridge rectifier,
a power factor correction (PFC) stage coupled to the bridge rectifier, and
a DC to DC converter coupled to the PFC stage.

18. A method of fabricating a power supply module comprising:
providing a conversion circuit;
coupling an alternating current (AC) fault detector to the conversion circuit;
configuring the AC fault detector to generate a first alert signal after detecting and in response to a fault condition associated with an AC input, wherein the power supply module is associated with a power rating requirement and a thermal design power rating;
coupling a direct current (DC) fault detector to the conversion circuit; and
configuring the DC fault detector to generate a second alert signal in response to a fault condition in which an output voltage associated with a DC output drops below a threshold associated with a common bus, and reduce the power rating requirement of each of the power supply modules from a peak power consumption to a power consumption equal to the peak power consumption less an amount of throttling available, wherein the throttling includes one or more of processor power or memory power, wherein the peak power consumption does not exceed the thermal design power rating.

19. The method of claim 18, wherein the DC fault detector is coupled to the DC output of the conversion circuit.

20. The method of claim 19, further including coupling an output capacitor to the DC output of the conversion circuit, wherein the output capacitor is sized to absorb a current spike associated with the fault condition, wherein each power supply module is configured to not continuously supply maximum power, and wherein the second fault condition includes one or more of a rectifier failure, converter failure, or capacitor short.

21. The method of claim 19, further including providing the power supply module with a temporary peak power rating that is to support a current spike associated with the fault condition.

22. The method of claim 19, further including configuring the power supply module to rely on an external buffer capacitor to absorb a current spike associated with the fault condition.

23. The method of claim 18, wherein providing the conversion circuit includes:
providing a bridge rectifier;
coupling a power factor correction (PFC) stage to the bridge rectifier; and
coupling a DC to DC converter to the PFC stage.

* * * * *